SIGNAL TERMINATOR CIRCUIT

Filed March 22, 1952

INVENTOR.
J. A. HENDERSON
BY Philip M. Bolton
ATTORNEY 2,726,329
Patented Dec. 6, 1955

2,726,329

SIGNAL TERMINATOR CIRCUIT

J Alvin Henderson, Fort Wayne, Ind., assignor to International Telephone and Telegraph Corporation, a corporation of Maryland Application March 22, 1952, Serial No. 278,100

8 Claims. (Cl. 250—27)

Figure 1:
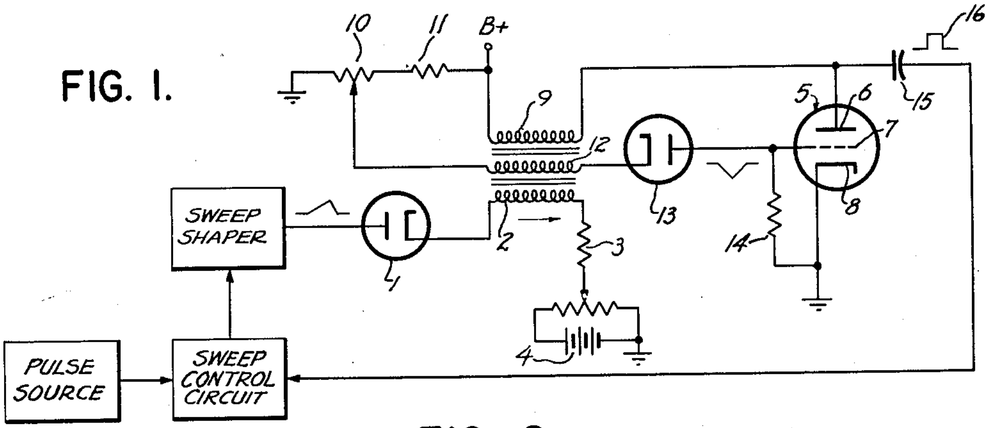

This invention relates to a signal terminator circuit and particularly to a circuit for generating a voltage to terminate a signal exceeding a given reference characteristic.

In most systems wherein intelligence is transmitted, received or displayed, certain signals are usually discriminated or compared against reference signals to maintain a desired degree of accuracy within the system. Discriminators for comparing the phase or frequency of two signals and supplying a corrective signal in response to characteristic differences in the two signals are well known.

There are also known amplitude-comparison circuits which compare the amplitude of the incoming signal with a reference voltage and accordingly supplies a corrective signal to succeeding networks. In particular, one such known amplitude-comparison circuit compares a negative input pulse which is applied over the primary of a transformer to the cathode of a diode, the anode being connected to the reference voltage and to the control grid of a pentode amplified. The secondary of the transformer is connected to the cathode of the amplifier. Thus, when the negative input voltage reaches the reference voltage the diode conducts, completing a feedback path through the amplifier and rapidly cutting off the input pulse. Although the output of the amplifier is a sharp pulse, a distorted reproduction of the portion of the negative input wave below the reference voltage occurs at the plate of the diode. This wave tends to carry the pentode grid negative and, thus, acts as a trigger for regeneration. This relaxation oscillation or "bouncing" is accentuated by any quasi differentiation in the transformer operating upon the overshoot of the cathode wave.

An object of this invention is to overcome the undesirable bouncing and further to provide an amplitude-comparison circuit adaptable for terminating positive wave forms at a given amplitude which is particularly important for sweep circuit considerations.

A feature of this invention is the unique combination of a blocking oscillator with a selective circuit to provide signal termination at a given amplitude.

Another feature of my invention is to provide in combination with a blocking type oscillator, a novel means to prevent the oscillator from being biased in a given sense.

In accordance with one aspect of my invention, there is provided a circuit for generating a voltage to terminate an input signal at a given amplitude. To accomplish this a first circuit is coupled between a reference voltage source and an input source and is operative in response to an input signal having an amplitude exceeding the reference voltage. There is further provided a normally conducting circuit coupled to the first circuit and having means responsive to the operation of the first circuit for reducing the rate of conduction of the normally conducting circuit. Another means is provided, which is responsive to the change in conduction of the normally conducting circuit, to rapidly cut off the conducting circuit. Thus, the normally conducting circuit produces a signal for generating a voltage to terminate the input signal at the given amplitude.

In accordance with another aspect of my invention, there is provided an oscillator circuit of the regenerative feedback type having a feedback coil in the anode circuit and a secondary coil inductively coupled to the feedback coil, connected in the grid circuit. In addition to the customary elements in the oscillator circuit there is provided a diode connected between the secondary coil and the grid to prevent the grid from being biased by regenerative energy of a given sense.

Figure 2:
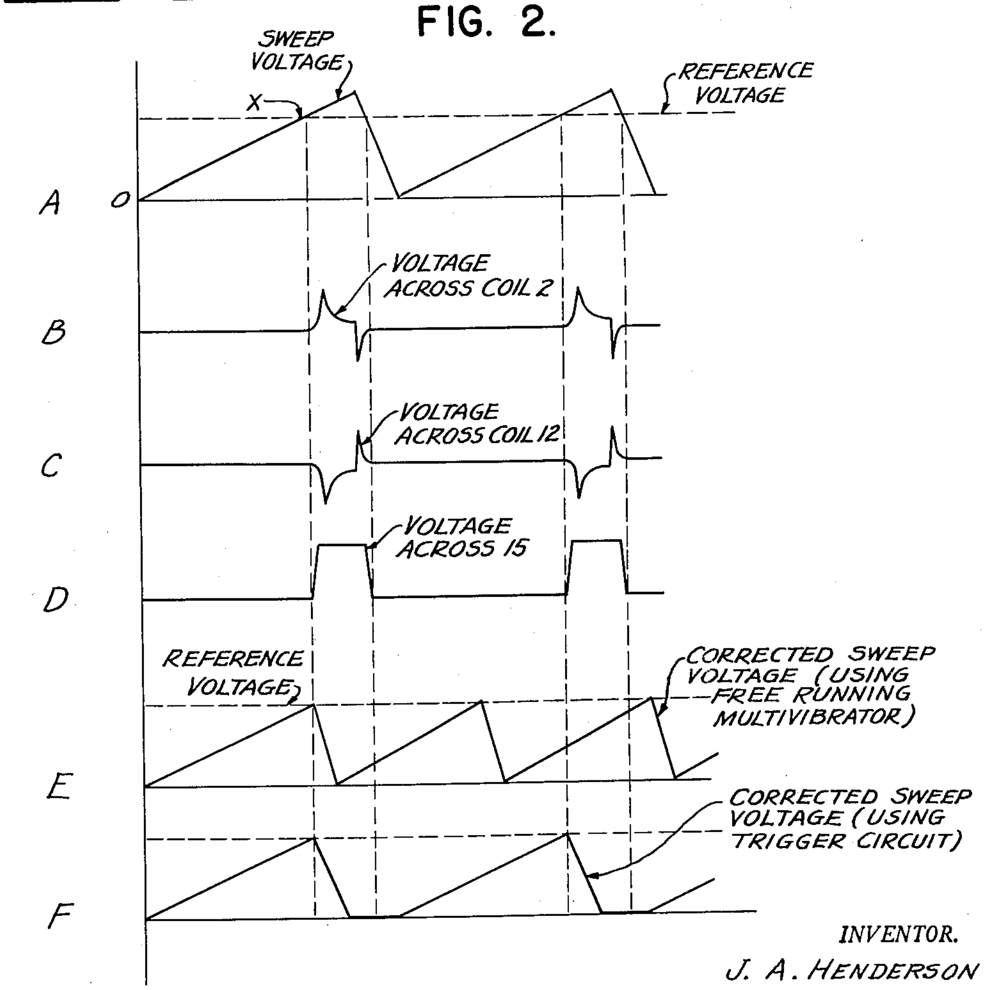

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 shows schematically a terminator circuit forming an embodiment of my invention; and Fig. 2 is a graphical illustration of the voltage wave forms taken across different points in the terminator circuit.

Referring to Fig. 1, there is shown a circuit for generating a voltage to terminate a positive input sweep signal upon the sweep signal exceeding a given reference voltage. The circuit comprises a pulse source feeding a sweep control circuit, which may be of the multivibrator or trigger circuit type, or other known sweep generating circuits. The output of the sweep control circuit is connected to a sweep shaper circuit to shape the pulses to a desired waveform, e. g., sawtooth waveform. The output of the sweep shaper is connected to an amplitude-comparison circuit comprising a diode 1 having its anode connected to the output of the sweep shaper, and its cathode connected over a coil 2, a biasing resistor 3, to a reference voltage supply 4.

An oscillator circuit of the regenerative feedback type is coupled to the amplitude-comparison circuit and comprises a tube 5, which may be of the triode type, comprising an anode 6, grid 7 and a cathode 8. In the anode circuit 6 thereof, there is connected a feedback coil 9 to B+ supply. Biasing resistors 10 and 11 are connected between B+ and ground to provide suitable biasing potentials for the anode and grid circuits of tube 5. A secondary coil 12 is inductively coupled to the feedback coil 9, and to the coil 2, and is connected between biasing resistor 10, over a diode 13 to the grid 7 of the triode. The diode 13 is connected so that its cathode is connected to the coil 12 and its anode is connected to grid 7. A resistor 14 is connected in the grid-cathode circuit of tube 5 to impose a negative bias on the grid 7 when the diode 13 is conducting. The coil 12 is so connected with respect to coil 2 that a positive going current in coil 2 induces a negative going current in coil 12. The output of the oscillator circuit is connected over a capacitor 15 to the input of the sweep control circuit.

In order to better understand the operation of the terminator circuit the operation will be described in connection with Fig. 2 showing the voltage waveforms at various points in the circuit. Initially, the triode 5 is conducing strongly and diodes 1 and 13 are non-conducting, assuming the sweep control circuit to be a free running multivibrator, suppying a pulse to the sweep shaper where it is shaped in the form of a sawtooth wave and exceeding the amplitude of reference voltage 4. The sweep voltage and reference voltage are shown by graph A in Fig. 2. At point X (graph A) where the sweep voltage is just equal to the reference voltage, diode 1 starts to conduct. A voltage is produced across coil 2 by virtue of diode 1 conducting. The waveform of this voltage, is shown by graph B, where it is seen that the voltage goes rapidly positive upon coil 2 becoming energized and then the voltage tapers off until the peak of the sweep voltage is reached. Shortly after the peak of the sweep voltage is reached, the voltage across coil 2 goes rapidly negative in accordance with the sense of the sweep voltage. As previously stated, coil 12 is so connected that a positive current in coil 2 induces a negative current in coil 12. Therefore the voltage across coil 12 takes the waveform shown by graph C; i. e., opposite in phase to the voltage across coil 2. Thus, diode 13 is biased to conduct driving the grid of tube 5 negative thereby reducing the plate current of tube 5. Since the feedback coil 9 is connected to be regenerative, the plate current is rapidly cut-off in accordance with the usual blocking type oscillator action. Although the voltage across coil goes positive (graph C) after the peak of the sweep voltage is reached, this positive voltage does not drive the grid of tube 5 positive because the diode is cut-off and as a result thereof, prevents the positive voltage from reaching the grid.

While tube 5 is conducting strongly, the B+ supply is connected over coil 9 through tube 5 to ground; therefore capacitor 15 does not charge. However, upon tube 5 cutting-off, capacitor 15 charges rapidly. Upon subsequent conduction of tube 5, the capacitor 15 is discharged to produce a pulse 16. The voltage waveform across capacitor 15 is shown in graph D in Fig. 2. This sharp pulse 16 is transferred to the multivibrator circuit to cut-off the sweep voltage at the desired amplitude.

For the case of the free-running multivibrator circuit it is seen (graph E) that the amplitude of the waveform is maintained constant irrespective of the variations in the time base. However, if it is important to have the sweeps occur at particular intervals of time, and in addition to maintain the amplitude constant, a trigger circuit may be substituted for the free-running multivibrator circuit; in such case the wave form will take the shape of the curve shown by graph F, in Fig. 2.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A circuit network to produce an output signal in response to a given input signal, comprising a reference voltage source, a first circuit coupled to said reference voltage source and operative in response to an input voltage substantially equal to said reference voltage, a normally conducting circuit coupled to said first circuit, inductive means intercoupled between said first circuit and said normally conducting circuit and responsive to the operation of said first circuit for reducing the rate of conduction of the normally conducting circuit, means responsive to the change in conduction of said normally conducting circuit to rapidly cut-off said conducting circuit, and means connected between said normally conducting circuit and said first circuit responsive to the change in conduction of the normally conducting circuit for producing an output signal.

2. A circuit network for generating a voltage to terminate an input signal at a given amplitude, comprising an input signal source supplying a signal of given amplitude, a reference voltage source of value substantially equal to said given amplitude, a first circuit coupled between said voltage source and said input source and operative in response to an input signal having an amplitude substantially equal to said reference voltage, a normally conducting circuit coupled to said first circuit, a first inductive means in said normally conducting circuit responsive to the operation of said first circuit for reducing the rate of conduction of the normally conducting circuit, second means in said normally conducting circuit responsive to the change of conduction in said normally conducting circuit to rapidly cut-off said conducting circuit, and means connected between said normally conducting circuit and said input source responsive to the change in conduction of said normally conducting circuit to supply a voltage to terminate the input signal at the given amplitude.

3. A circuit network according to claim 2 wherein said first circuit comprises a conductive device connected to said input source and a first coil coupled between said conductive device and said reference voltage source, whereby an input signal having an amplitude equal to said reference voltage causes the device to conduct thereby energizing said coil.

4. The circuit network according to claim 3 wherein said normally conducting circuit comprises an oscillator circuit of the feedback type comprising a tube having an anode and grid, a feedback coil in the anode circuit thereof, a secondary coil inductively coupled to said feedback coil and connected in the grid circuit of said oscillator, said secondary coil being inductively coupled to said first coil, and said energization of the first coil inducing a current in a secondary coil to vary the bias in the grid circuit thereof to reduce the rate of conduction of said normally conducting circuit.

5. The circuit network according to claim 3 wherein said means responsive to the change in conduction of said normally conducting circuit comprises a feedback coil coupled to the normally conducting circuit, and said means in the normally conducting circuit responsive to the operation of said first circuit comprises a secondary coil inductively coupled to said first coil.

6. A circuit for terminating an input signal at a given amplitude, comprising an input signal source, a reference voltage source having a value substantially equal to said given amplitude, a diode having its anode connected to said input source, a first coil connected between the cathode of said diode and said reference voltage source, whereby an input signal having an amplitude equal to said reference voltage operates said diode and energizes said coil; a normally conducting oscillator circuit comprising a tube having an anode and grid, a feedback coil in the anode circuit thereof, a secondary coil inductively coupled to said feedback coil and to said first coil and connected in the grid circuit of said oscillator, whereby the energization of said first coil induces a current in the secondary coil to reduce the conduction of said tube which feeds back a regenerative current to rapidly cut itself off, and output circuit means connected between the anode of said tube and said input signal source for terminating said input signal in response to the change in conduction of said tube.

7. A circuit for generating a voltage to terminate a positive input signal having an amplitude equal to the values of a given reference voltage, comprising an input signal source, a reference voltage source, a diode having its anode connected to said input source, a first coil connected between the cathode of said diode and said reference voltage source, whereby an input signal having an amplitude equal to said reference voltage operates said diode and energizes said coil; a normally conducting oscillator circuit comprising a tube having an anode and grid, a feedback coil in the anode circuit thereof, a secondary coil inductively coupled to said feedback coil and to said first coil and connected in the grid circuit of said oscillator, whereby the energization of said first coil induces a current in the secondary coil to reduce the conduction of said tube which feeds back a regenerative current to rapidly cut itself off; and output circuit means connected between the anode of said tube and said input signal source for delivering a voltage to said circuit in response to the change in conduction of said tube.

8. A circuit for generating a voltage to terminate a positive input sweep signal having an amplitude equal to the value of a given reference voltage, comprising an input sweep signal source, a reference voltage source, a first diode having its anode connected to said input source, a first coil connected between the cathode of said diode and said reference voltage source, whereby an input signal having an amplitude equal to said reference voltage operates said diode and energizes said coil; a normally conducting oscillator circuit of the regenerative feedback type comprising a tube having an anode and grid, a feedback coil in the anode circuit thereof, a secondary coil inductively coupled to said feedback coil and to said first coil and connected in the grid circuit of said oscillator, a second diode having its anode connected to the grid of said tube and its cathode connected to the secondary coil, the secondary coil being so connected with respect to said first coil that the energization of the first coil induces a negative current in the secondary coil to render the second diode conducting thereby reducing the conduction of said tube which feeds back a regenerative current to rapidly cut itself off; and output circuit means connected between the anode of said tube and said input sweep signal source for delivering a voltage to said sweep circuit in response to the change in conduction of said tube.

References Cited in the file of this patent

UNITED STATES PATENTS

| | | |
|---|---|---|
| 2,212,202 | Faudell et al. | Aug. 20, 1940 |
| 2,265,290 | Knick | Dec. 9, 1941 |
| 2,414,486 | Rieke | Jan. 21, 1947 |
| 2,448,069 | Ames, Jr. et al. | Aug. 31, 1948 |
| 2,540,923 | Williams | Feb. 6, 1951 |
| 2,581,199 | Moe | Jan. 1, 1952 |
| 2,614,222 | Skellett | Oct. 14, 1952 |
| 2,627,025 | Trembly | Jan. 27, 1953 |
| 2,627,031 | Moore | Jan. 27, 1953 |